(12) United States Patent
Yu et al.

(10) Patent No.: US 9,170,655 B2
(45) Date of Patent: Oct. 27, 2015

(54) TIP ELEMENT CAPABLE OF LIGHT COLLECTION, AND LIGHT-EMITTING TOUCH PEN INCORPORATING THE SAME FOR AN OPTICAL TOUCH DEVICE

(71) Applicant: UC-LOGIC TECHNOLOGY CORP., New Taipei (TW)

(72) Inventors: Joe Yu, New Taipei (TW); Ryan Teng, New Taipei (TW)

(73) Assignee: UC-LOGIC TECHNOLOGY CORP., New Taipei (TW)

( * ) Notice: Subject to any disclaimer, the term of this patent is extended or adjusted under 35 U.S.C. 154(b) by 294 days.

(21) Appl. No.: 13/686,591

(22) Filed: Nov. 27, 2012

(65) Prior Publication Data
US 2014/0146015 A1    May 29, 2014

(51) Int. Cl.
*G06F 3/0354* (2013.01)
*G06F 3/03* (2006.01)

(52) U.S. Cl.
CPC .................................... *G06F 3/0304* (2013.01)

(58) Field of Classification Search
CPC ............ G06F 3/03545; G06F 3/03542; G06F 3/0317; G06F 3/0386; G06F 3/042; G06F 3/0421; G06F 1/163
USPC ........................................ 345/175, 182–183
See application file for complete search history.

(56) References Cited

U.S. PATENT DOCUMENTS

| | | | |
|---|---|---|---|
| 8,319,753 B2 * | 11/2012 | Ko ................................ | 345/179 |
| 2003/0146906 A1 * | 8/2003 | Lin ............................... | 345/179 |
| 2011/0018799 A1 * | 1/2011 | Lin ............................... | 345/157 |
| 2011/0102373 A1 * | 5/2011 | Chang et al. .................. | 345/175 |

* cited by examiner

*Primary Examiner* — Kent Chang
*Assistant Examiner* — Scott Au
(74) *Attorney, Agent, or Firm* — Pepper Hamilton LLP (57) ABSTRACT

A tip element for a light-emitting touch pen includes: a solid transparent rod having a first rod portion disposed in a pen barrel, and an exposed second rod portion with a tip; and a light collecting unit including a first light-collecting structure formed coaxially in the first rod portion, and a second light-collecting structure formed, coaxially in the second rod portion and projecting toward the first rod portion. A part of light, which is emitted by a lighting unit in the pen barrel and propagates into the first rod portion, is reflected/refracted by the first light-collecting structure toward the second light-collecting structure to thereby radiate out of the second rod portion through reflection/refraction thereby.

19 Claims, 6 Drawing Sheets

TIP ELEMENT CAPABLE OF LIGHT COLLECTION, AND LIGHT-EMITTING TOUCH PEN INCORPORATING THE SAME FOR AN OPTICAL TOUCH DEVICE

BACKGROUND OF THE INVENTION

1. Field of the Invention

The invention relates to a touch pen for a touch device, and more particularly to a light-emitting touch pen for an optical touch device.

2. Description of the Related Art

Figure 1:
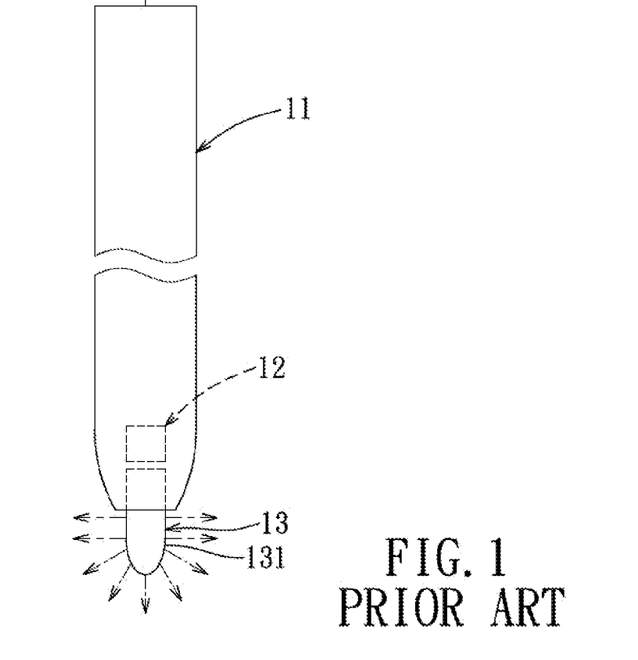
FIG. 1 is a schematic view showing a conventional light-emitting touch pen.

FIG. 1 illustrates a conventional touch pen, which serves as a pointing pen for an optical touch device (not shown). The conventional touch pen includes a pen barrel 11, a light-transmissive tip body 13 mounted to the pen barrel 11 and having an exposed portion 131 that extends outwardly of the pen barrel 11 in an axial direction of the pen barrel 11, and a light source 12 (such as an LED) mounted coaxially in the pen barrel 11 and disposed adjacent to the tip body 13 such that light emitted by the light source 12 radiates out through the exposed portion 131 of the tip body 13. When the tip body 13 touches a touch screen 100 of the optical touch device (see FIG. 2), the light radiated from the exposed portion 131 of the tip body 13 is sensed by an optical sensor module (not shown) of the optical touch device, such that a sensed position (P') associated with a touch point of the tip body 13 on the touch screen 100 is determined by the optical touch device and is displayed on the touch screen 100.

It is noted that the exposed portion 131 of the tip body 13 has a length ranging from 5 mm to 6 mm. As a result, when the tip body 13 touches the touch screen 100, a position on the touch screen 100, which corresponds to a central point (C) of the exposed portion 131 of the tip body 13 (see FIG. 2), is determined by the optical touch device as the sensed position (P').

Figure 2:
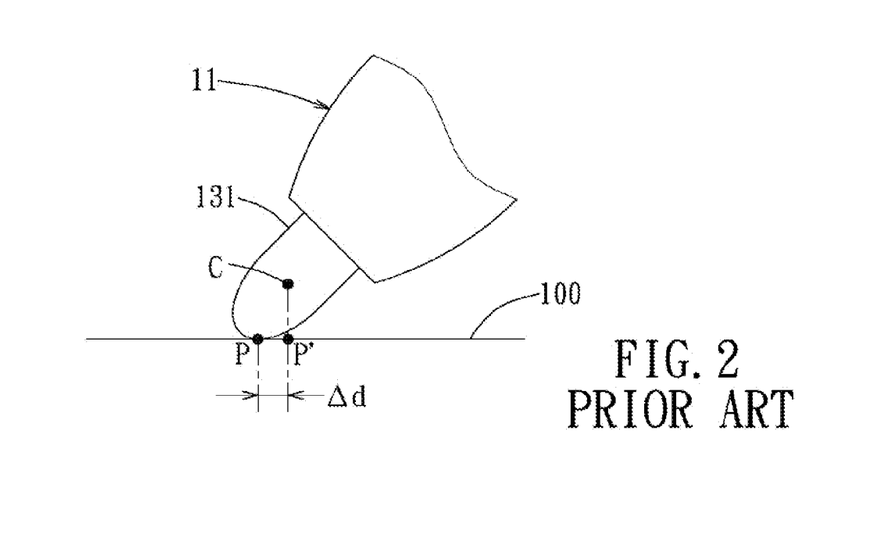
FIG. 2 is a fragmentary schematic view illustrating the conventional limit-emitting touch pen when touching a touch screen.

In use, as shown in FIG. 2, when the conventional touch pen inclinedly touches the touch screen 100 with the tip body 13, there is a displacement (Δd) between a position (P) of a touch point of the tip body 13 on the touch screen 100 and the sensed position (P') associated with the touch point of the tip body 13 and displayed on the touch screen 100. In this case, the optical touch device locates the touch point of the tip body 13 on the touch screen 100 with reduced accuracy. It should be noted that the longer the length of the exposed portion 131 of the tip body 13, the greater the displacement (Δd). Therefore, when such touch pen is used with the optical touch device, the optical touch device may not ensure accuracy in locating a touch point on the touch screen 100.

SUMMARY OF THE INVENTION

Therefore, the object of the present invention is to provide a tip element capable of light collection, and a light-emitting touch pen incorporating the same for an optical touch device that can overcome the aforesaid drawbacks of the prior art.

According to one aspect of the present invention, there is provided a light-emitting touch pen for an optical touch device. The light-emitting touch pen of this invention comprises a pen barrel, a tip element, and a lighting unit. The pen barrel has an open end. The tip element includes a solid transparent rod, and a light collecting unit. The transparent rod extends in an axial direction of the pen barrel, and is mounted detachably to the pen barrel. The transparent rod has a first rod portion disposed in the pen barrel and adjacent to the open end of the pen barrel, and a second rod portion connected to the first rod portion and extending outwardly of the pen barrel through the open end. The second rod portion of the transparent rod has a tip used to touch the optical touch device. The light collecting unit includes a first light-collecting structure formed coaxially in the first rod portion of the transparent rod, and a second light-collecting structure formed coaxially in the second rod portion of the transparent rod, projecting toward the first rod portion of the transparent rod and disposed adjacent to the tip of the second rod portion of the transparent rod. The lighting unit is secured in the pen barrel, is radially adjacent to the first rod portion of the transparent rod, and is capable of emitting light.

A part of the light, which is emitted by the lighting unit and propagates into the first rod portion of the transparent rod, is reflected/refracted by the first light-collecting structure toward the second light-collecting structure such that the light reflected/refracted toward the second light-collecting structure is reflected/refracted by the second light-collecting structure to radiate out of the second rod portion of the transparent rod.

According to another aspect of the present invention, there is provided a tip element for a light-emitting touch pen. The light-emitting touch pen includes a pen barrel that has an open end, and a lighting unit that is secured in the pen barrel to be close to the open end and that is capable of emitting light. The tip element of this invention comprises a solid transparent rod, and a light collecting unit. The transparent rod extends in an axial direction of the pen barrel, and is adapted to be mounted detachably to the pen barrel. The transparent rod has a first rod portion adapted to be disposed in the pen barrel and adjacent to the open end of the pen barrel such that the lighting unit is radially adjacent to the first rod portion, and a second rod portion connected to the first rod portion and extending outwardly of the pen barrel through the open end. The second rod portion of the transparent rod has a tip. The light collecting unit includes a first light-collecting structure formed coaxially in the first rod portion of the transparent rod, and a second light-collecting structure formed coaxially in the second rod portion of the transparent rod, projecting toward the first rod portion of the transparent rod and disposed adjacent to the tip of the second rod portion of the transparent rod.

A part of the light, which is emitted by the lighting unit and propagates into the first rod portion of the transparent rod, is reflected/refracted by the first light-collecting structure toward the second light-collecting structure such that the light reflected/refracted toward the second light-collecting structure is reflected/refracted by the second light-collecting structure to radiate out of the second rod portion of the transparent rod.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
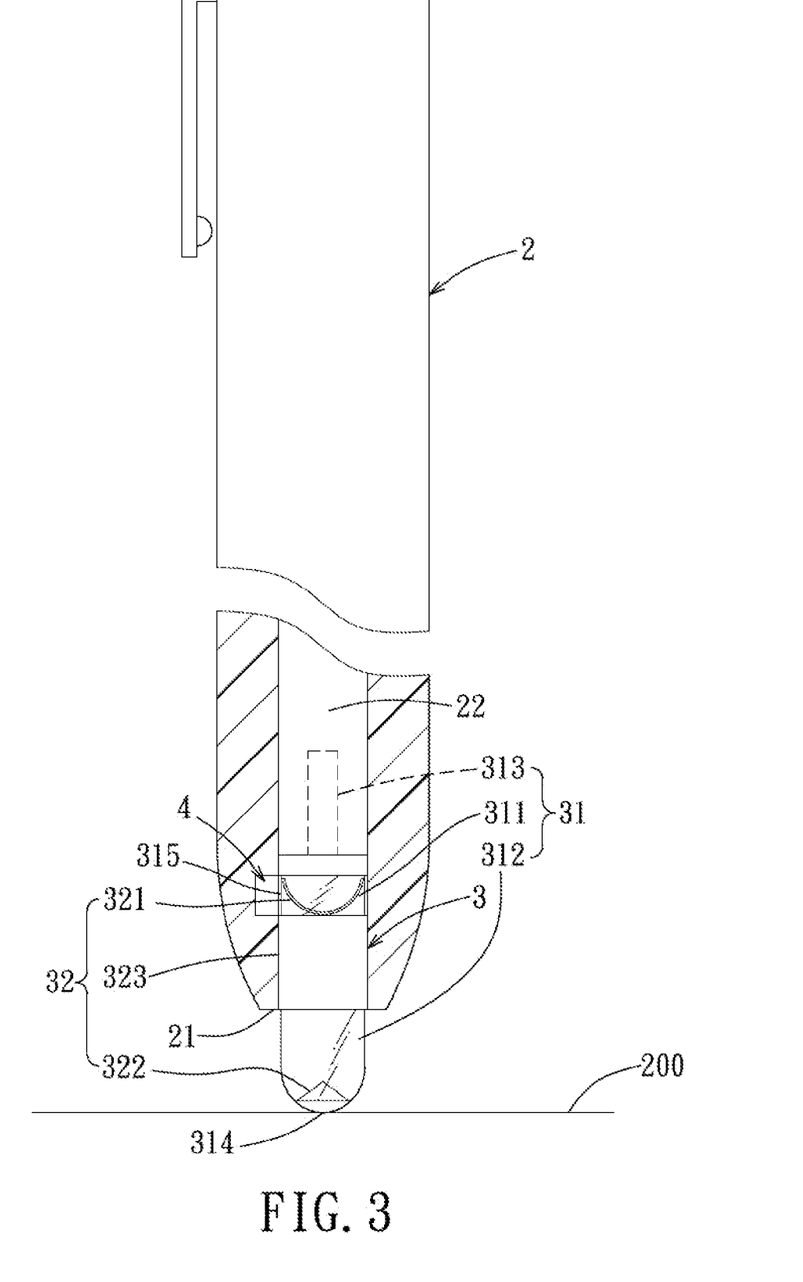
FIG. 3 is a fragmentary, partly schematic sectional view showing a preferred embodiment of a light-emitting touch pen for an optical touch device according to the present invention.

Referring to FIG. 3, according to the preferred embodiment of the present invention, a light-emitting touch pen for an optical touch device (not shown) includes a pen barrel 2, a tip element 3, and a lighting unit 4.

The pen barrel 2 is made of an opaque material, and has an open end 21.

Figure 4:
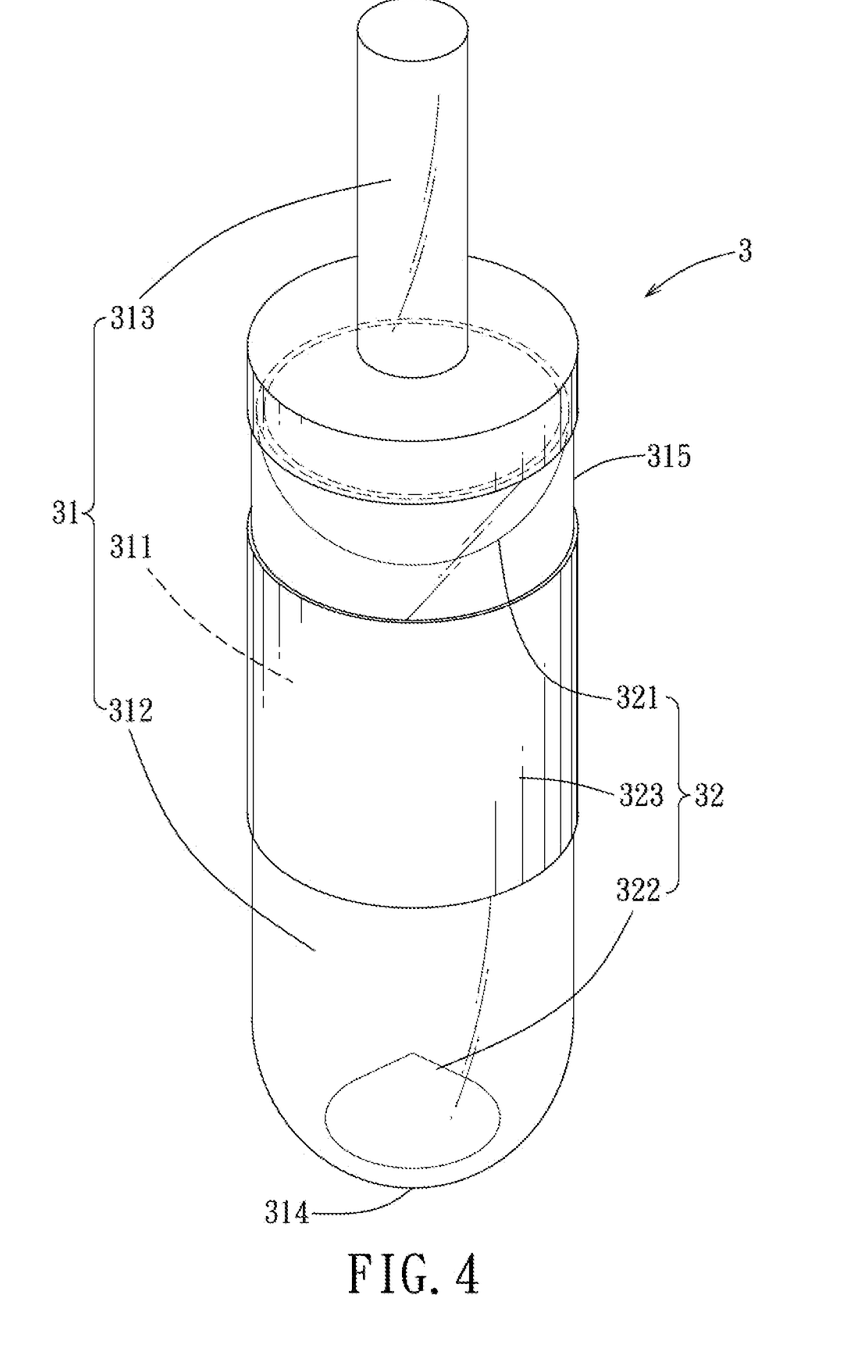
FIG. 4 is a perspective view showing a tip element of the light-emitting touch pen of the preferred embodiment.
Figure 5:
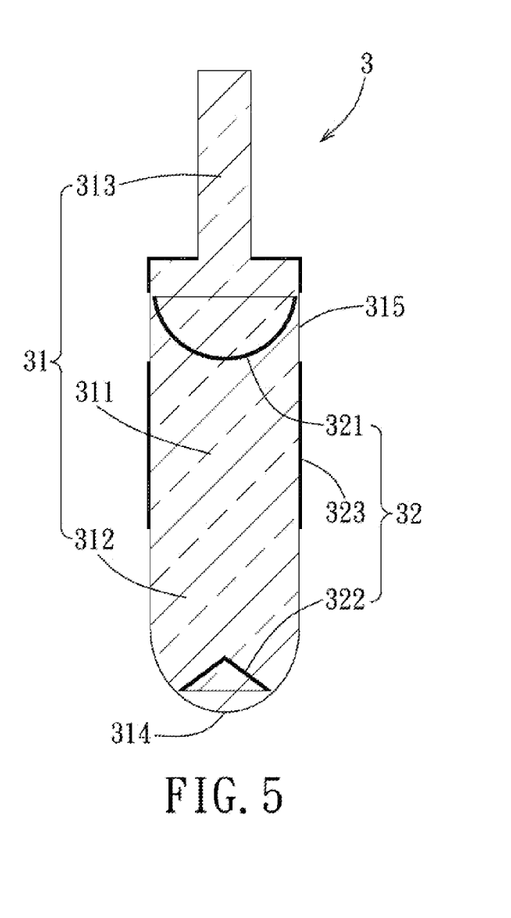
FIG. 5 is a schematic sectional view showing the tip element of the light-emitting touch pen of the preferred embodiment.

Referring further to FIGS. 4 and 5, the tip element 3 includes a solid transparent rod 31 extending in an axial direction of the pen barrel 2 and mounted detachably to the pen barrel 2, and a light collecting unit 32.

In this embodiment, the transparent rod 31 is made of a transparent light-guiding material, such as acrylic. The transparent rod 31 has a first rod portion 311 disposed in the pen barrel 2 and adjacent to the open end 21 of the pen barrel 2, a second rod portion 312 connected to the first rod portion 311, extending outwardly of the pen barrel 2 through the open end 21 and having a tip 314 that is used to touch a touch surface 200 (see FIG. 3) of the optical touch device, and a third rod portion 313 opposite to the second rod portion 312 in the axial direction, connected to the first rod portion 311 and thinner than the first and second rod portions 311, 312. The third rod portion 313 is inserted tightly into a mounting tube 22 in the pen barrel 2 (see FIG. 3).

The light collecting unit 32 includes a first light-collecting structure 321, a second light-collecting structure 322, and a reflecting layer 323. The first light-collecting structure 321 is formed coaxially in the first rod portion 311 of the transparent rod 31. In this embodiment, the first light-collecting structure 321 is in the form of a generally convex whitened reflection/refraction surface, which is disposed coaxially in the first rod portion 311, projects toward the second rod portion 312 of the transparent rod 31, and is formed by laser etching a convex region in the first rod portion 311 projecting toward the second rod portion 312. In this embodiment, the generally convex whitened reflection/refraction surface of the first light-collecting structure 321 has, but is not limited to, a hemispherical shape. The second light-collecting structure 322 is formed coaxially in the second rod portion 312 of the transparent rod 31, projects toward the first rod portion 311, and is disposed adjacent to the tip 314 of the second rod portion 312. In this embodiment, the second light-collecting structure 322 is in the form of a generally convex whitened reflection/refraction surface, which projects toward the first rod portion 311 and is formed by laser etching a convex region in the second rod portion 322 projecting toward the first rod portion 311. In this embodiment, the generally convex whitened reflection/refraction surface of the second light-collecting structure 322 has, but is not limited to, a conical shape. The reflecting layer 323 is partially coated onto an outer surface of the first rod portion 311 of the transparent rod 31 in a manner that an annular surface portion 315 of the outer surface of the first rod portion 311 is exposed, so that the first light-collecting structure 321 is visible through the annular surface portion 315 of the outer surface of the first rod portion 311. It is noted that the annular surface portion 315 of the outer surface of the first rod portion 311 is polished to effectively receive light from the outside of the tip element 3.

The lighting unit 4, such as a light-emitting diode, is secured in the pen barrel 2 and is capable of emitting light. The lighting unit 4 is radially adjacent to the first rod portion 31 and corresponds to the exposed annular surface portion 315 of the outer surface of the first rod portion 311 in position, such that the light emitted by the lighting unit 4 may propagate into the first rod portion 311 through the exposed annular surface portion 315 of the outer surface of the first rod portion 311. Thus, a part of the light, which is emitted by the lighting unit 4 and propagates into the first rod portion 311 through the polished annular surface portion 315 of the outer surface of the first rod portion 311, is reflected/refracted by the first light-collecting structure 321 toward the second light-collecting structure 322 and/or the reflecting layer 323. Then, the light reflected/refracted from the first light-collecting structure 321 toward the second light-collecting structure 322 and/or reflected by the reflecting layer 323 toward the second light-collecting structure 322 is reflected/refracted by the second light-collecting structure 322 to radiate out of the second rod portion 312.

Figure 6:
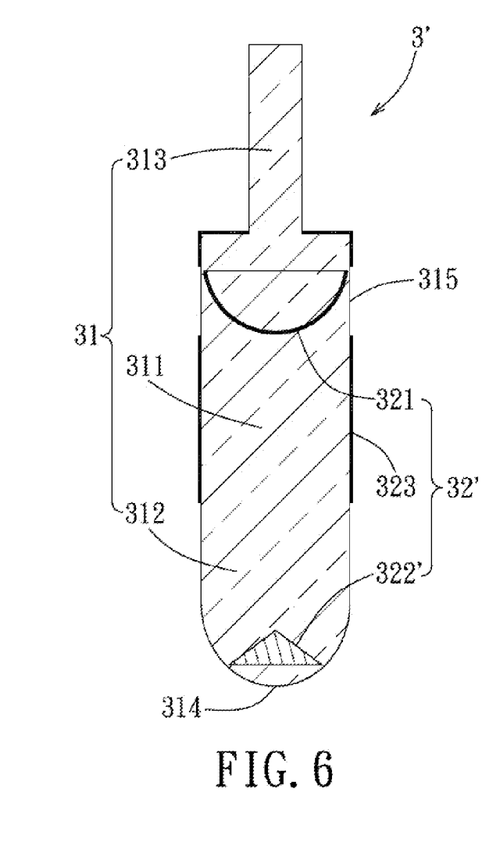
FIG. 6 is a schematic sectional view showing a first variation of the tip element of the light-emitting touch pen of the preferred embodiment.

FIG. 6 illustrates a first variation of the tip element 3'. Unlike the tip element 3 of FIG. 5, the second light-collecting structure 322' of the light collecting unit 32' is a metal piece, which is embedded coaxially in the second rod portion 312 of the transparent rod 31 and has a generally convex outer reflection surface projecting toward the first rod portion 311 of the transparent rod 31. In this embodiment, the generally convex outer reflection surface of the second light-collecting structure 322' has, but is not limited to, a conical shape.

Figure 7:
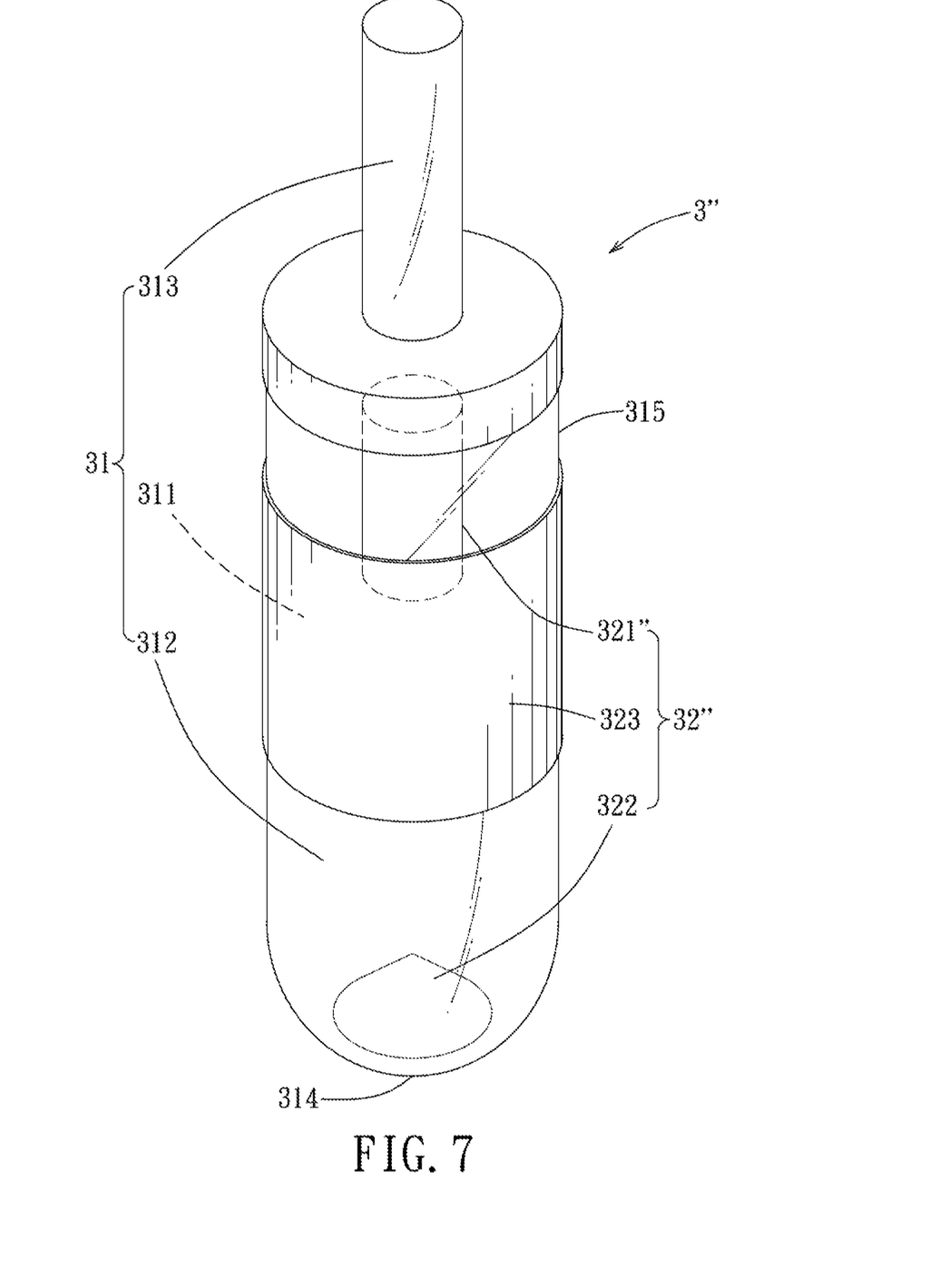
FIG. 7 is a perspective view showing a second variation of the tip element of the light-emitting touch pen of the preferred embodiment.
Figure 8:
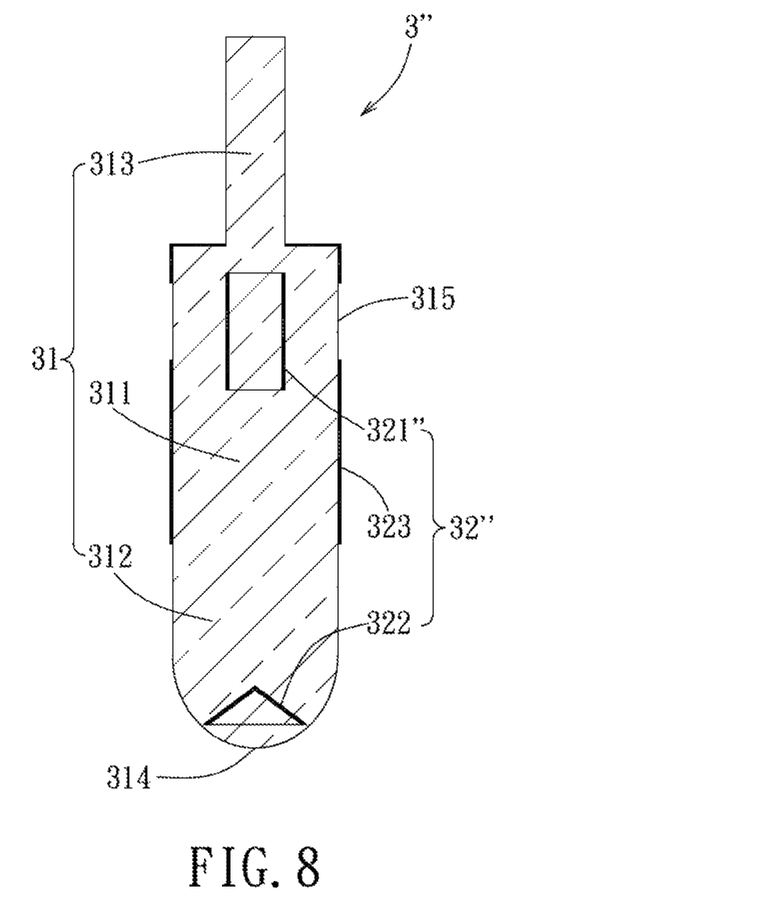
FIG. 8 is a schematic sectional view showing the second variation of the tip element of the light-emitting touch pen of the preferred embodiment.

FIGS. 7 and 8 illustrate a second variation of the tip element 3". Unlike the tip element 3 of FIGS. 4 and 5, the first light-collecting structure 321" of the light collecting unit 32" is in the form of an annular whitened reflection/refraction surface, which is disposed coaxially in the first rod portion 311 of the transparent rod 31 and is formed by laser etching an annular region in the first rod portion 311 of the transparent rod 31.

To sum up, since the second light-collecting structure 322/322' is adjacent to the tip 314, the light emitted by the lighting unit 4 is collected by the light collecting unit 3 and then, is reflected/refracted by the second light-collecting structure 322/322' to radiate out at the second rod portion 312, thereby forming a lighting point very close to the tip 314. Therefore, in use, even though the light-emitting touch pen inclinedly touches the touch surface 200 of the optical touch device with the tip 314, a sensed position on the touch surface 200 associated with a touch point of the tip 314 and determined by the optical touch device based on the light radiated from the second light-collecting structure 322 is very close to the position of the touch position of the tip 314 on the touch surface 200. In this case, the optical touch device can locate the touch point of the tip 314 on the touch surface 200 with enhanced accuracy. Therefore, when the light-emitting touch pen of this invention is used with the optical touch device, the optical touch device can ensure accuracy in locating a touch point on the touch surface 200.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light-emitting touch pen for an optical touch device, comprising:
   a pen barrel having an open end;
   a detachable tip element including
   a solid transparent rod extending in an axial direction of said pen barrel and mounted to said pen barrel, said transparent rod being inserted into said pen barrel through said open end and being directly detachable from said pen barrel through said open end, said transparent rod having a first rod portion disposed in said pen barrel and adjacent to said open end of said pen barrel, and a second rod portion connected to said first rod portion and extending outwardly of said pen barrel through said open end, said second rod portion of said transparent rod having a tip used to touch the optical touch device, and
   a light collecting unit including a first light-collecting structure formed coaxially in said first rod portion of said transparent rod, and a second light-collecting structure formed coaxially in said second rod portion of said transparent rod, projecting toward said first rod portion of said transparent rod and disposed adjacent to said tip of said second rod portion of said transparent rod; and
   a lighting unit secured in said pen barrel, radially adjacent to said first rod portion of said transparent rod and capable of emitting light;
   wherein a part of the light, which is emitted by said lighting unit and propagates into said first rod portion of said transparent rod, is reflected/refracted by said first light-collecting structure toward said second light-collecting structure such that the light reflected/refracted toward said second light-collecting structure is reflected/refracted by said second light-collecting structure to radiate out of said second rod portion of said transparent rod, wherein said second light-collecting structure of said light collecting unit is in the form of a generally convex whitened reflection/refraction surface, which projects toward said first rod portion and is formed by laser etching a convex region in said second rod portion of said transparent rod projecting toward said first rod portion.

2. The light-emitting touch pen as claimed in claim 1, wherein said lighting unit is a light-emitting diode.

3. The light-emitting touch pen as claimed in claim 1, wherein:
   said transparent rod of said tip element is made of a transparent light-guiding material.

4. The light-emitting touch pen as claimed in claim 1, wherein said generally convex whitened reflection/refraction surface of said second light-collecting structure of said light collecting unit has a conical shape.

5. The light-emitting touch pen as claimed in claim 1, wherein said first light-collecting structure of said light collecting unit is in the form of an annular whitened reflection/refraction surface, which is disposed coaxially in said first rod portion of said transparent rod and is formed by laser etching an annular region in said first rod portion of said transparent rod.

6. The light-emitting touch pen as claimed in claim 1, wherein said first light-collecting structure of said light collecting unit is in the form of a generally convex whitened reflection/refraction surface, which projects toward said second rod portion of said transparent rod and is formed by laser etching a convex region in said first rod portion of said transparent rod projecting toward said second rod portion.

7. The light-emitting touch pen as claimed in claim 6, wherein said generally convex whitened reflection/refraction surface of said first light-collecting structure of said light collecting unit is hemispherical in shape.

8. The light-emitting touch pen as claimed in claim 1, wherein said second light-collecting structure of said light collecting unit is a metal piece, which is embedded coaxially in said second rod portion of said transparent rod and has a generally convex outer reflection surface projecting toward said first rod portion of said transparent rod.

9. The light-emitting touch pen as claimed in claim 8, wherein said generally convex outer reflection surface of said second light-collecting structure of said light collecting unit has a conical shape.

10. The light-emitting touch pen as claimed in claim 1, wherein:
    said light collecting unit further includes a reflecting layer partially coated onto an outer surface of said first rod portion of said transparent rod in a manner that an annular surface portion of said outer surface of said first rod portion of said transparent rod corresponding to said lighting unit is exposed so as to permit the light emitted by said lighting unit to propagate into said first rod portion of said transparent rod through said annular surface portion of said outer surface of said first rod portion of said transparent rod; and
    the light reflected/refracted by said first light-collecting structure propagates toward said second light-collecting structure and/or said reflecting layer, such that the light reflected/refracted from said first light-collecting structure toward said second light-collecting structure and/or reflected by said reflecting layer toward said second light-collecting structure is reflected/refracted by said second light-collecting structure to radiate out of said second rod portion of said transparent rod.

11. A tip element for a light-emitting touch pen, the light-emitting touch pen including a pen barrel that has an open end, and a lighting unit that is secured in the pen barrel to be close to the open end and that is capable of emitting light, said tip element comprising:
    a solid transparent rod extending in an axial direction of the pen barrel and adapted to be mounted detachably to the pen barrel, said transparent rod having a first rod portion adapted to be disposed in the pen barrel and adjacent to the open end of the pen barrel such that the lighting unit is radially adjacent to the first rod portion, and a second rod portion connected to said first rod portion and configured to extend outwardly of the pen barrel through the open end, said second rod portion of said transparent rod having a tip; and
    a light collecting unit including a first light-collecting structure formed coaxially in said first rod portion of said transparent rod, and a second light-collecting structure formed coaxially in said second rod portion of said transparent rod, projecting toward said first rod portion of said transparent rod and disposed adjacent to said tip of said second rod portion of said transparent rod;
    wherein a part of the light, which is emitted by the lighting unit and propagates into said first rod portion of said transparent rod, is reflected/refracted by said first light-collecting structure toward said second light-collecting structure such that the light reflected/refracted toward said second light-collecting structure is reflected/refracted by said second light-collecting structure to radiate out of said second rod portion of said transparent rod, wherein said second light-collecting structure of said light collecting unit is in the form of a generally convex whitened reflection/refraction surface, which projects toward said first rod portion and is formed by laser etching a convex region in said second rod portion of said transparent rod projecting toward said first rod portion.

12. The tip element as claimed in claim 11, wherein:
said transparent rod is made of a transparent light-guiding material.

13. The tip element as claimed in claim 1, wherein said generally convex whitened reflection/refraction surface of said second light-collecting structure of said light collecting unit has a conical shape.

14. The tip element as claimed in claim 1, wherein said first light-collecting structure of said light collecting unit is in the form of an annular whitened reflection/refraction surface, which is disposed coaxially in said first rod portion of said transparent rod and is formed by laser etching an annular region in said first rod portion of said transparent rod.

15. The tip element as claimed in claim 1, wherein said first light-collecting structure of said light collecting unit is in the form of a generally convex whitened reflection/refraction surface, which projects toward said second rod portion of said transparent rod and is formed by laser etching a convex region in said first rod portion of said transparent rod projecting toward said second rod portion.

16. The tip element as claimed in claim 15, wherein said generally convex whitened reflection/refraction surface of said first light-collecting structure of said light collecting unit is hemispherical in shape.

17. The tip element as claimed in claim 11, wherein said second light-collecting structure of said light collecting unit is a metal piece, which is embedded coaxially in said second rod portion of said transparent rod and has a generally convex outer reflection surface projecting toward said first rod portion of said transparent rod.

18. The tip element as claimed in claim 17, wherein said generally convex outer reflection surface of said second light-collecting structure of said light collecting unit has a conical shape.

19. The tip element as claimed in claim 11, wherein:
said light collecting unit further includes a reflecting layer partially coated onto an outer surface of said first rod portion of said transparent rod in a manner that an annular surface portion of said outer surface of said first rod portion of said transparent rod corresponding to the lighting unit is exposed so as to permit the light emitted by the lighting unit to propagate into said first rod portion of said transparent rod through said annular surface portion of said outer surface of said first rod portion of said transparent rod; and
the light reflected/refracted by said first light-collecting structure propagates toward said second light-collecting structure and/or said reflecting layer, such that the light reflected/refracted from said first light-collecting structure toward said second light-collecting structure and/or reflected by said reflecting layer toward said second light-collecting structure is reflected/refracted by said second light-collecting structure to radiate out of said second rod portion of said transparent rod.

* * * * *